(12) United States Patent
Rakshit

(10) Patent No.: US 12,724,400 B2
(45) Date of Patent: Sep. 1, 2026

(54) 3D PRINTING IN A CONFINED SPACE

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 18/485,836

(22) Filed: Oct. 12, 2023

(65) Prior Publication Data

US 2024/0036548 A1 Feb. 1, 2024

Related U.S. Application Data

(62) Division of application No. 17/354,052, filed on Jun. 22, 2021, now Pat. No. 11,841,695.

(51) Int. Cl.

| | |
|---|---|
| ***G05B 19/4099*** | (2006.01) |
| ***B29C 64/227*** | (2017.01) |
| ***B29C 64/25*** | (2017.01) |
| ***B29C 64/393*** | (2017.01) |
| ***B29C 73/02*** | (2006.01) |
| ***B33Y 40/00*** | (2020.01) |

(52) U.S. Cl.

CPC ........ *G05B 19/4099* (2013.01); *B29C 64/227* (2017.08); *B29C 64/25* (2017.08); *B29C 64/393* (2017.08); *B29C 73/02* (2013.01); *B33Y 40/00* (2014.12); *G05B 2219/49023* (2013.01)

(58) Field of Classification Search

CPC ..... Y10S 901/01; B62D 57/032; B62D 57/02; B62D 57/024

USPC ......................... 901/1; 180/8.5, 8.1, 164, 8.6

See application file for complete search history.

(56) References Cited

U.S. PATENT DOCUMENTS 4,288,177 A * 9/1981 Schoonmade ........ E02B 17/022 405/196
4,321,976 A * 3/1982 Reinke .................. B62D 57/00 180/8.5
4,416,344 A * 11/1983 Nakada .................. B66C 23/80 180/199
4,674,949 A * 6/1987 Kroczynski ................ B25J 5/00 414/730
4,790,400 A * 12/1988 Sheeter ..................... E02F 9/04 180/8.1
4,940,382 A * 7/1990 Castelain ................. B64F 5/10 180/8.5

(Continued)

FOREIGN PATENT DOCUMENTS

CN 109366995 A 2/2019
CN 212764796 U 3/2021

(Continued)

OTHER PUBLICATIONS

Rakshit, Sarbajit K., "3D Printing in a Confined Space," U.S. Appl. No. 17/354,052, filed Jun. 22, 2021.

(Continued)

*Primary Examiner* — Jason L Vaughan

(74) *Attorney, Agent, or Firm* — Seed Intellectual Property Law Group LLP

(57) ABSTRACT

A 3D printing system comprising, an extendable body, a material delivery system, a first wall adhesion device, and a second wall adhesion device.

10 Claims, 9 Drawing Sheets

(56) References Cited

U.S. PATENT DOCUMENTS 5,077,510 A * 12/1991 Collie .................. B62D 57/024 901/22
5,351,626 A * 10/1994 Yanagisawa ......... B62D 57/032 180/164
5,351,773 A * 10/1994 Yanagisawa ......... B62D 57/032 180/8.5
5,429,009 A * 7/1995 Wolfe .................. B62D 57/032 180/8.5
5,468,099 A * 11/1995 Wheetley ................ B23B 39/04 408/1 R
5,551,525 A * 9/1996 Pack .................... B62D 57/032 180/8.1
5,588,900 A * 12/1996 Urakami ................... B24C 3/06 451/92
5,921,336 A * 7/1999 Reed ..................... E21B 15/003 180/8.5
6,105,695 A * 8/2000 Bar-Cohen ........... B62D 57/024 180/8.5
8,019,472 B2 * 9/2011 Montero Sanjuan ..... B64F 5/10 180/8.5
8,534,395 B2 * 9/2013 Niederberger .......... F24S 40/20 180/8.5
8,925,185 B2 * 1/2015 Sarh .......................... B25J 5/00 901/10
9,314,969 B1 * 4/2016 Davis ..................... G05B 15/02
9,475,527 B2 * 10/2016 Gamboa ................... B64F 5/10
9,993,973 B1 6/2018 Barnhart
10,065,280 B2 * 9/2018 Sarh ........................ B23P 19/06
10,518,411 B2 12/2019 Gilman et al.
11,724,758 B2 * 8/2023 Izuo ....................... B60K 17/02 180/209
11,841,695 B2 * 12/2023 Rakshit ................... B22F 10/20
2016/0121486 A1 * 5/2016 Lipinski .............. B05B 13/0431 427/427.3
2021/0072725 A1 3/2021 Rakshit
2022/0091579 A1 3/2022 Rakshit et al.
2023/0011911 A1 1/2023 Wang et al.

FOREIGN PATENT DOCUMENTS

CN 112720778 A 4/2021
DE 102017216117 A1 3/2018
WO 2015/003221 A1 1/2015
WO 2021/173754 A1 9/2021

OTHER PUBLICATIONS

List of IBM Patents or Patent Applications Treated as Related, Filed Herewith, 2 pages.

* cited by examiner

3D PRINTING IN A CONFINED SPACE

BACKGROUND

Aspects of the present disclosure relate to 3D printing and more particularly in 3D printing in a confined space.

Many 3D printers is an additive manufacturing technique used to build or repair many different types of parts. The flexibility and adaptability of 3D printing technology makes it an invaluable tool for many different applications.

BRIEF SUMMARY

The present disclosure provides a method, computer program product, and system of 3D printing in a confined space.

Some embodiments of the present disclosure may be illustrated by a system comprising an extendable body, a material delivery system, a first wall adhesion device, and a second wall adhesion device.

In some embodiments, the method includes engaging one or more rear adhesion devices of a crevasse 3D printer, extending a body of the crevasse 3D printer, disengaging the one or more rear adhesion devices, engaging one or more front adhesion devices of the crevasse 3D printer, contracting the body of the crevasse 3D printer, and disengaging the one or more front adhesion devices.

Some embodiments of the present disclosure can also be illustrated by a computer program product comprising a computer readable storage medium having program instructions embodied therewith, the program instructions executable by a processor to cause the processors to perform a method, the method comprising engaging one or more rear adhesion devices of a crevasse 3D printer, extending a body of the crevasse 3D printer, disengaging the one or more rear adhesion devices, engaging one or more front adhesion devices of the crevasse 3D printer, contracting the body of the crevasse 3D printer, and disengaging the one or more front adhesion devices.

DETAILED DESCRIPTION

Aspects of the present disclosure relate to 3D printing and more particularly to 3D printing in a confined space. While the present disclosure is not necessarily limited to such applications, various aspects of the disclosure may be appreciated through a discussion of various examples using this context.

In some situations, a crevasse (such as a hole or crack in a part) may need to be repaired. However, effectively delivering repair material to the depths of the crevasse may prove difficult. Currently, 3D printers are not designed to address such issues. Typically, if a narrow crack is detected in a complex area, then a complete dismantling, or even replacement, of the machine part is required, thereby increasing the downtime and cost of repairing of the machine. Therefore, a self-propelled 3D printer capable of traversing and printing in a narrow passage is proposed. In some embodiments, the 3D printer may contract and expand to move along the passage and may have an on-board material storage chamber. In some instances, a crevasse may be a crack, a hole, or another type of gap in a part.

Figure 1A:
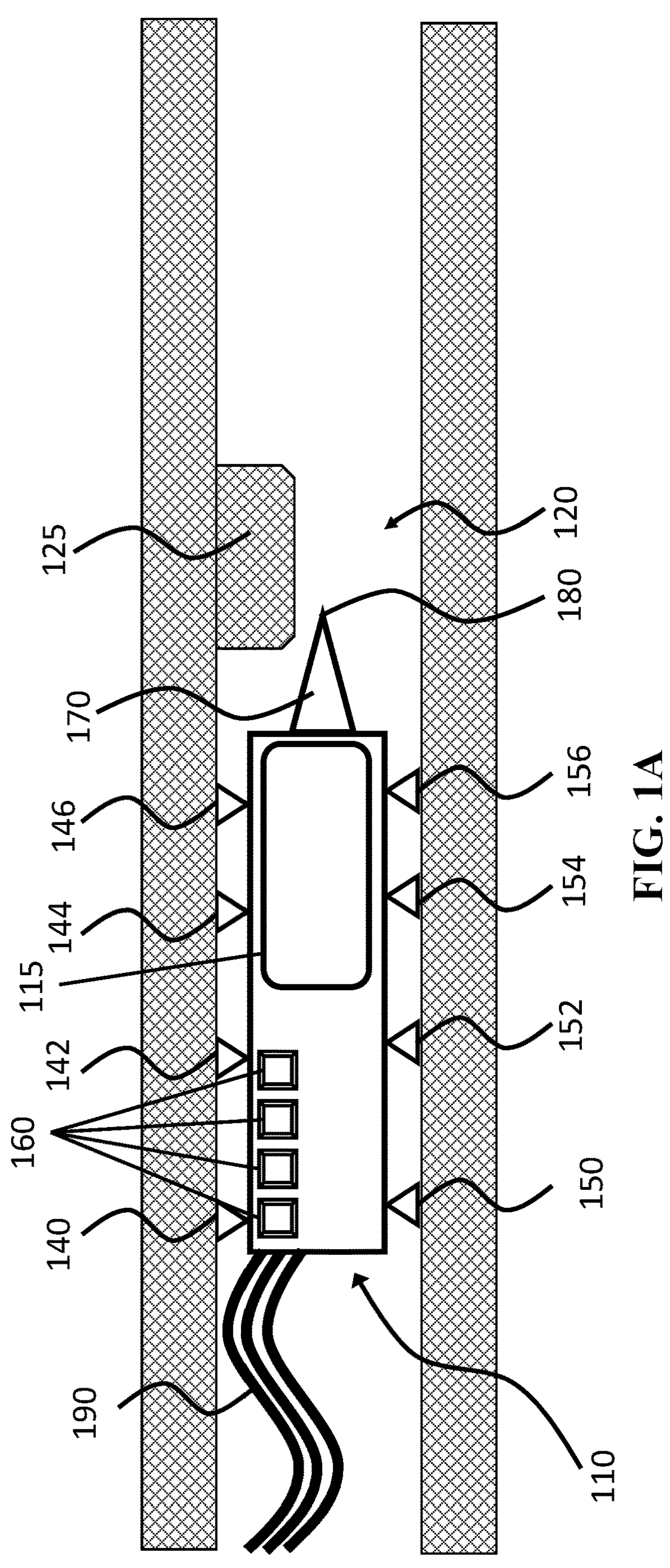
FIG. 1A depicts an example crevasse 3D printer according to various embodiments of the present invention.
Figure 1B:
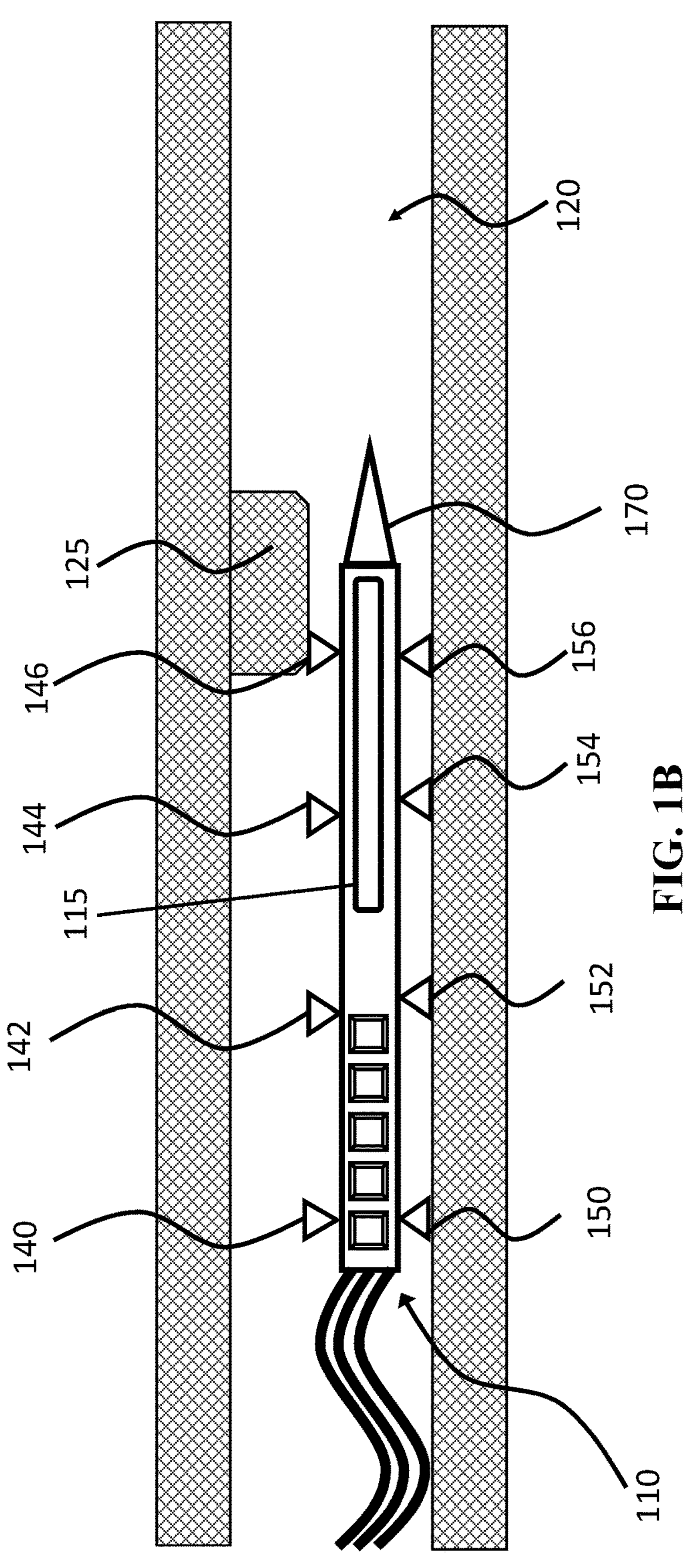
FIG. 1B depicts an example crevasse 3D printer according to various embodiments of the present invention.

FIGS. 1A and 1B depicts an example crevasse 3D printer 110 capable of printing in a narrow passage. In some embodiments, the crevasse 3D printer 110 has the capability to elongate and contract to move along a passage. For example, the body of the 3D printer may be made of an elastic material that is able to stretch. In some embodiments, a crevasse 3D printer may have a motor in the front attached to one or more driving members. For example, the crevasse 3D printer 110 may have one or more electric motors attached to one or more electric wheels.

In some embodiments, a 3D printer system (only partially depicted) may be able to control the shape of an elastic crevasse 3D printer. For example, the body of crevasse 3D printer 110 may have a series of pneumatic bladders, a series of pistons, be made of piezoelectric material, or some other hardware that causes the body of the crevasse 3D printer 110 to extend and shorten based on the command of a computer system. See FIG. 2A-E for a description of the movement mechanism. The crevasse 3D printer device as a whole may be flexible, even if some individual components of the crevasse 3D printer are not flexible, such that crevasse 3D printer 110 may conform and move along a passage. In some embodiments, crevasse 3D printer 110 may be fabricated such that the body of crevasse 3D printer 110 is short and wide as in FIG. 1A in a relaxed state and elongated by using a force to control the shape. The elongated shape is shown in FIG. 1B. For example, an internal spring may be attached to either end of crevasse 3D printer 110 to compress crevasse 3D printer 110 and a method of elongating the crevasse 3D printer 110 may be used to pull the front of crevasse 3D printer 110 deeper in the cavity while the rear of crevasse 3D printer 110 is locked to the walls of crevasse 120. A description of the movement mechanism is described in further detail in FIG. 2A-E. In some embodiments, 3D printer 110 may have a set of pneumatic bladders that are able to change the shape of 3D printer 110 to not only extend and contract, but also conform 3D printer 110 to the shape and size of the passage. For example, the bladders may inflate to elongate 3D printer 110, and the elongation may reduce the diameter of 3D printer 110.

In some embodiments, there may be multiple adhesion devices 140, 142, 144, 146, 150, 152, 154, and 156 along the body of crevasse 3D printer 110. For example, the adhesion devices 140-156 may be vacuum locks or magnetic locks. The adhesion devices 140-156 may be controlled with an on board microprocessor, such as one of components 160, or may be controlled with an external computing system, either connected wirelessly or with connections 190. In some embodiments, the vacuum or electricity for the adhesion devices may be generated on board, such as one of components 160, or may be delivered through connections 190. In some embodiments, the body of the crevasse 3D printer 110 may be able to expand and contract to such that the adhesion devices engage the surfaces of the wall. For example, in FIG. 1A, the adhesion devices are in contact with the walls of crevasse 120 and in FIG. 2B only 150-156 are in contact with the walls of crevasse 120 and adhesion device 146 is in contact with bump 125. In some embodiments, there may be a plethora of adhesion devices arrayed along the outside of crevasse 3D printer 110. For example, FIG. 1 A-B is a 2D cross section of the body and only depicts eight adhesion devices, but the entire exterior surface of crevasse 3D printer 110 may have an array of adhesion devices around a parameter of the device. In some embodiments, each adhesion device may be controlled individually. For example, adhesion devices 140 and/or 150 may be activated to secure a rear portion of crevasse 3D printer 110 while the other adhesion devices 142-146 and 152-156 are not activated and therefore the front of crevasse 3D printer 110 may move.

In some embodiments, crevasse 3D printer 110 may have a material delivery system 170. For example, the material delivery system may be a heated printer head, a photopolymer material extruder with a UV source, a metal powder distribution system with a laser sintering array, a foam agent extruder, or another material delivery system. In some embodiments, material delivery system 170 may be a nozzle to deliver material and the material may be set or cured by another means (e.g., a UV light). For example, material delivery system 170 may have a nozzle to extrude the printer material and a control valve to control the flow of the printer material. In some embodiments, material delivery system 170 may have one or more motors to control the nozzle tip 180 and therefore control the placement of the printer material by moving the nozzle. In some embodiments, the nozzle may be fixed with regard to the body of crevasse 3D printer 110 and the movement of crevasse 3D printer 110 may be used to control the placement of the printer material. In some embodiments, the valve may be controlled by a microprocessor, either on board crevasse 3D printer 110 or in linked computer system.

In some embodiments, 3D printer 110 may have a magnetic coil that expands, and contracts based on a generated magnetic field. The expansion and contraction of the magnetic coil may cause the body of 3D printer 110 to expand and contract. For example, a magnetic coil may be attached to either end of 3D printer 110 and as the coil expands and contracts the body of 3D printer 110 expands and contracts. In some embodiments, an external computing system may control the expansion and contraction of the magnetic field.

In some embodiments, 3D printer 110 includes a solenoid in the front and a magnet or solenoid in the back. When back solenoid is powered, it repels the solenoid/magnet in the front, causing it to push forward thereby expanding the body of 3D printer 110. When the rear solenoid is turned off the 3D printer 110 may contract (e.g., due to a spring). In some embodiments, the polarity of the solenoids may be reversed so the rear solenoid is attracted to the front solenoid/magnet. For example, 3D printer 110 may have a solenoid in the rear and a magnet in the front where the polarity of the solenoid determines if 3D printer 110 contracts or extends. When powered with a first polarity, the rear solenoid may repel a magnet attached to the front of 3D printer 110, but when powered with the opposite polarity the rear solenoid may attract a magnet attached to the front of 3D printer 110.

In some embodiments, the material that is delivered by the material delivery system 170 may be stored in cavity 115. For example, a spool of thermoplastic material or a container of resin may be stored in cavity 115. In some embodiments, cavity 115 may expand and contract with the body of crevasse 3D printer 110. For example, as shown by FIG. 1B cavity 115 has changed shape with the body of crevasse 3D printer 110 to allow the crevasse 3D printer 110 to navigate around bump 125.

In some embodiments, crevasse 3D printer 110 may perform a scan of crevasse 120 or may receive a feed from the external system to identify the shape and dimension of crevasse 120. For example, crevasse 3D printer 110 may be equipped with a sonar device (e.g., one of components 160) to develop a 3D image of crevasse 120. In some embodiments, other methods of determining the structure of crevasse 120 may be used. For example, the system may employ ultrasound or X-ray imaging techniques to obtain a 3D image of crevasse 120.

In some embodiments, the 3D imaging may be used to determine a path for crevasse 3D printer 110. For example, some passages may be too narrow for crevasse 3D printer 110 to traverse, so the 3D printer may be directed to follow another path. Likewise, the system may use the 3D imaging to determine how much material is needed to repair the crevasse. For example, a 3D image may be used to extrapolate the volume of material needed to repair a crevasse.

Figure 2A:
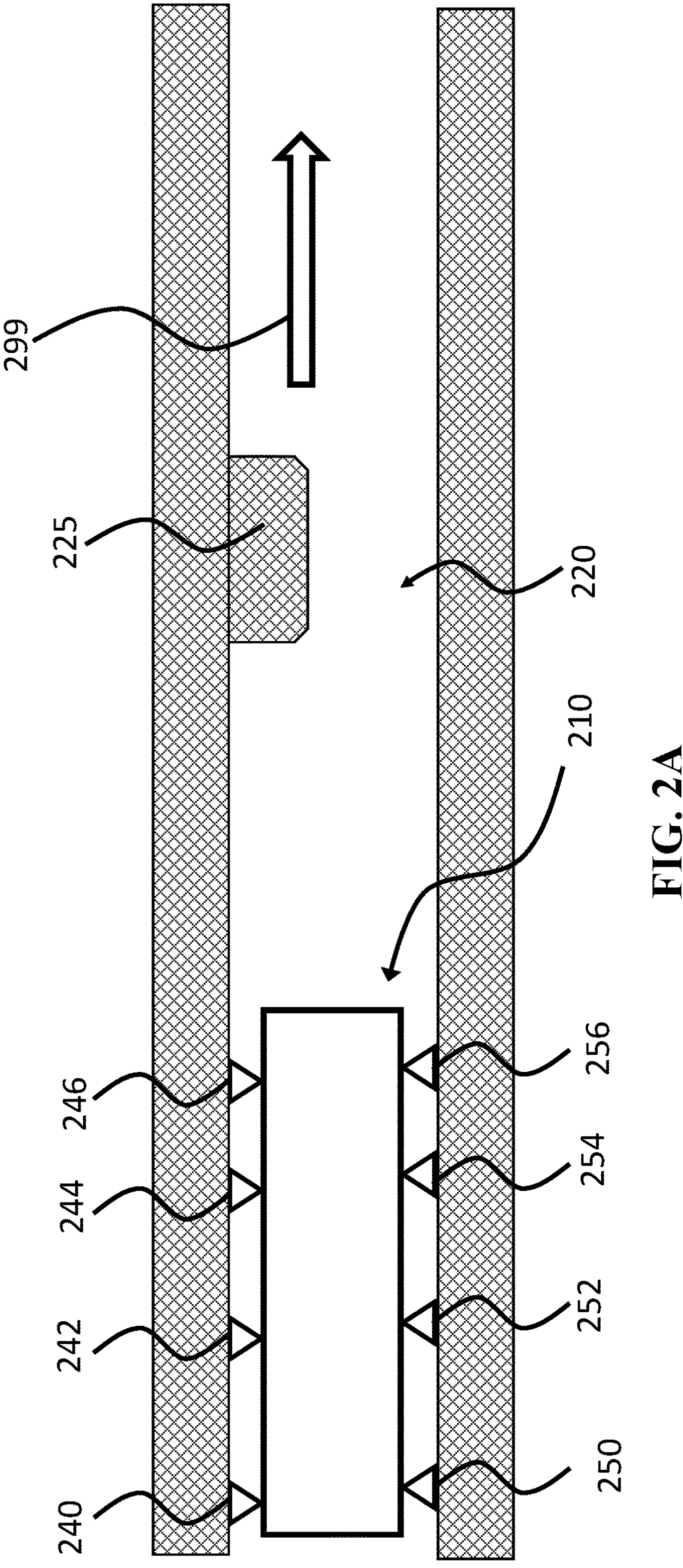
FIG. 2A depicts an example crevasse 3D printer in a stage of movement according to various embodiments of the present invention.

FIG. 2A-E depict an example movement of an example crevasse 3D printer 210 through crevasse 220. In FIG. 2A example, crevasse 3D printer 210 is in a retracted state. In some embodiments, to travel in direction 299, rear adhesion devices 250, 240, 242 and/or 252 engage to attach to walls of crevasse 220 with the body of crevasse 3D printer 210 in a retracted state. In some embodiments, the body of crevasse 3D printer 210 may extend uniformly (See FIG. 2A-2B) moving a front end (end closest to adhesion devices 246 and 256) in direction 299. In some embodiments, as crevasse 3D printer 210 is extending, some adhesion devices may be deactivated to detach from the wall of crevasse 220 as the diameter of crevasse 3D printer 210 shrinks. For example, adhesion devices 240 and 242 may be deactivated/detached because adhesion devices 240 and 242 cannot be attached at the same time, in this example, as adhesion devices 250 and 252 when the body of example crevasse 3D printer 210 is extended. In other instances, with a narrower crevasse, adhesion devices 240 and 242 may be attached at the same time as adhesion devices 250 and 252. After extending, engaged adhesion devices may disengage.

Figure 2B:
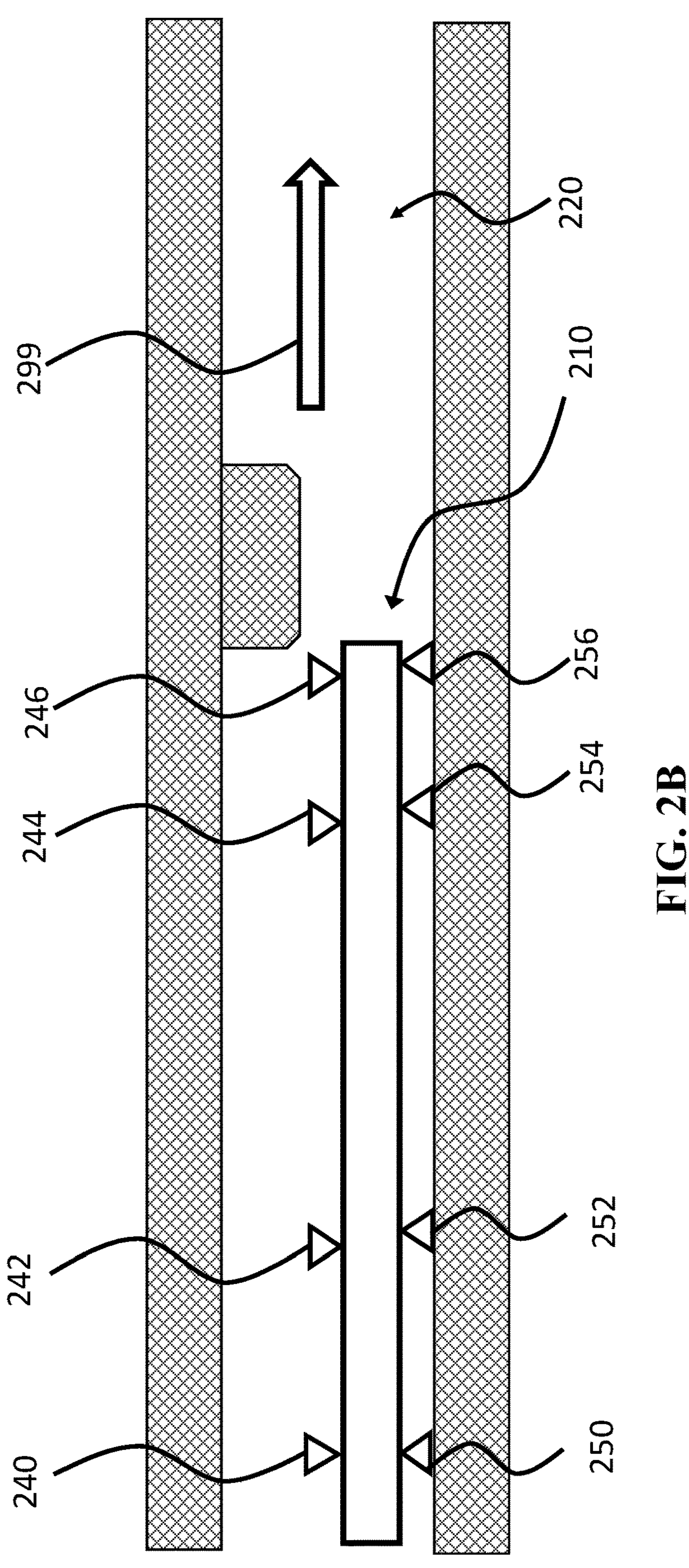
FIG. 2B depicts an example crevasse 3D printer in a stage of movement according to various embodiments of the present invention.

In some embodiments, crevasse 3D printer 210 may also contract to move along direction 299. In FIG. 2B, crevasse 3D printer 210 is in an extended state. In some embodiments, to travel in direction 299, front adhesion devices 256 and/or 254 engage to attach to walls of crevasse 220 and the body of crevasse 3D printer 210 is contracted to move the rear of crevasse 3D printer 210 in direction 299. After contracting, engaged adhesion devices may disengage. Front adhesion devices 244 and 246 are not engaged in FIG. 2B, but may be engaged in other situations or crevasse geometries.

Figure 2C:
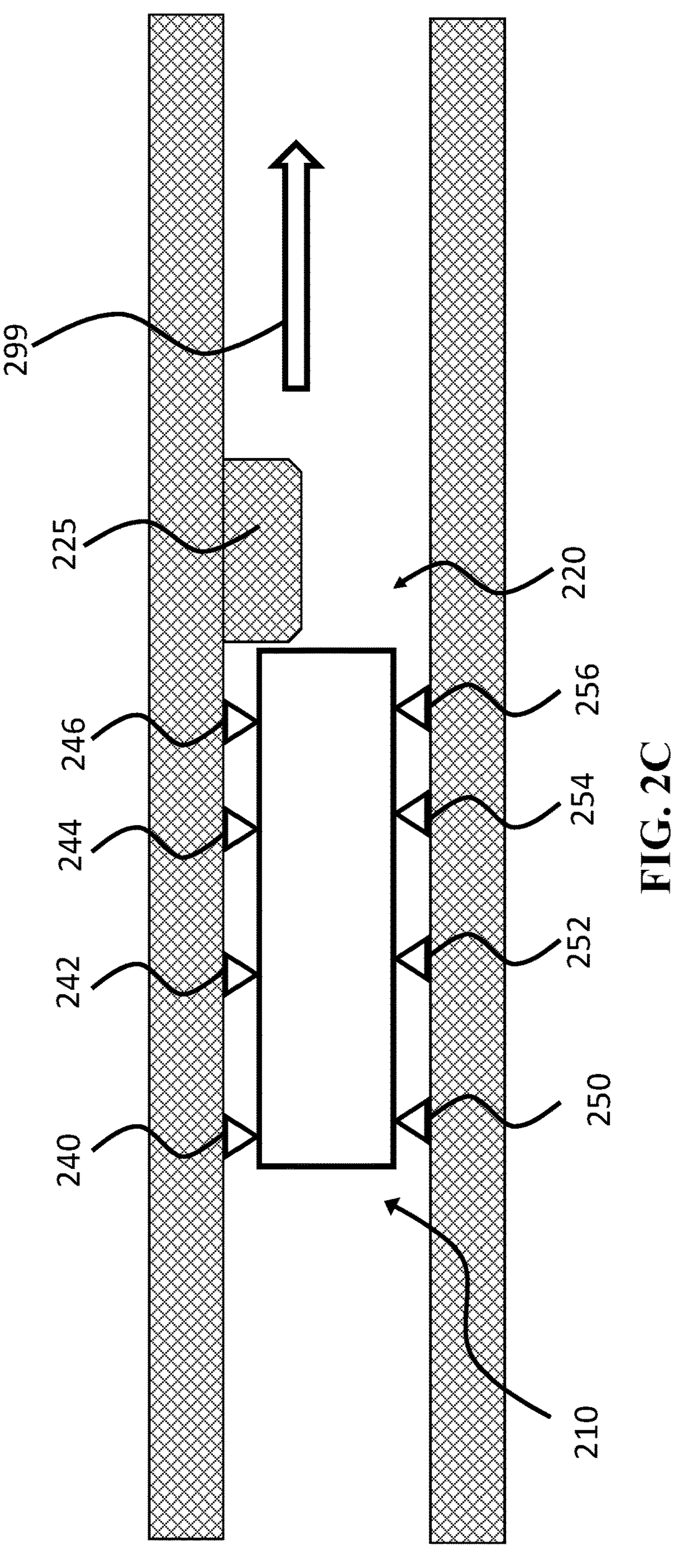
FIG. 2C depicts an example crevasse 3D printer in a stage of movement according to various embodiments of the present invention.
Figure 2D:
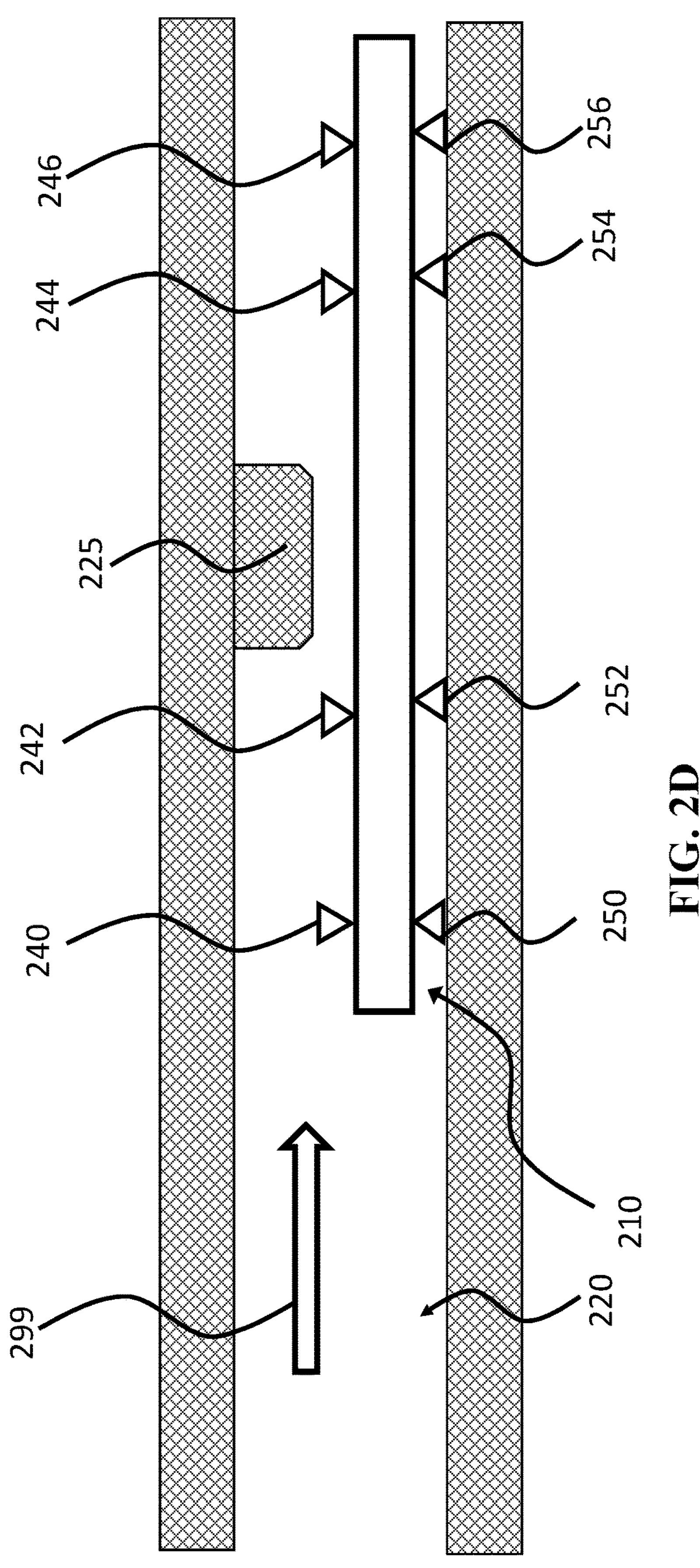
FIG. 2D depicts an example crevasse 3D printer in a stage of movement according to various embodiments of the present invention.

In some embodiments, the body of example crevasse 3D printer 210 contracts to move around obstacles or through narrow passages. A contracted state for crevasse 3D printer 210 is shown in FIG. 2C. To extend farther in direction 299, adhesion devices 250 and/or 252 engage holding steady the rear portion of crevasse 3D printer 210 to the wall of crevasse 220. The body of crevasse 3D printer 210 is extended under bump 225 to the position shown in FIG. 2D.

Figure 2E:
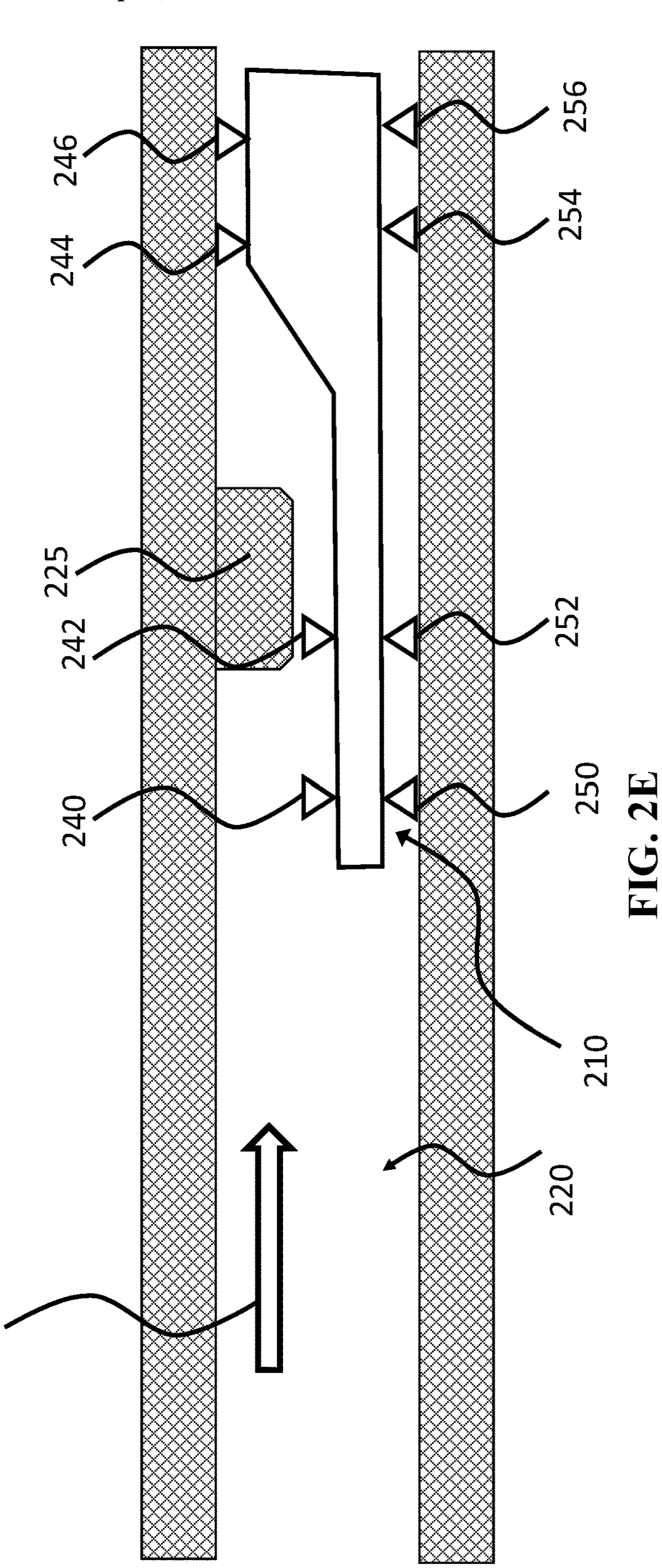
FIG. 2E depicts an example crevasse 3D printer in a stage of movement according to various embodiments of the present invention.

In some embodiments, the body of example crevasse 3D printer 210 may contract as allowed by the shape of a crevasse. In some embodiments, the body of example crevasse 3D printer 210 may contract uniformly as above or non-uniformly. A depiction of a non-uniformly contracted crevasse 3D printer 210 is shown in FIG. 2E, where only a front end of crevasse 3D printer 210 is contracted allowing front adhesion points 244 and 246 to engage to the side walls of crevasse 220. In some embodiments, non-uniform expansion and contraction allows crevasse 3D printer 210 to maneuver around obstacles such as bump 225 or through crevasses that have a variable gap. In some embodiments, pneumatic bladders are used to control the shape of 3D printer 210. For example, pneumatic bladders in the rear may be engaged to extend the body of 3D printer 210 and pneumatic bladders in the rear may be disengaged to contract the body of 3D printer 210.

Figure 3:
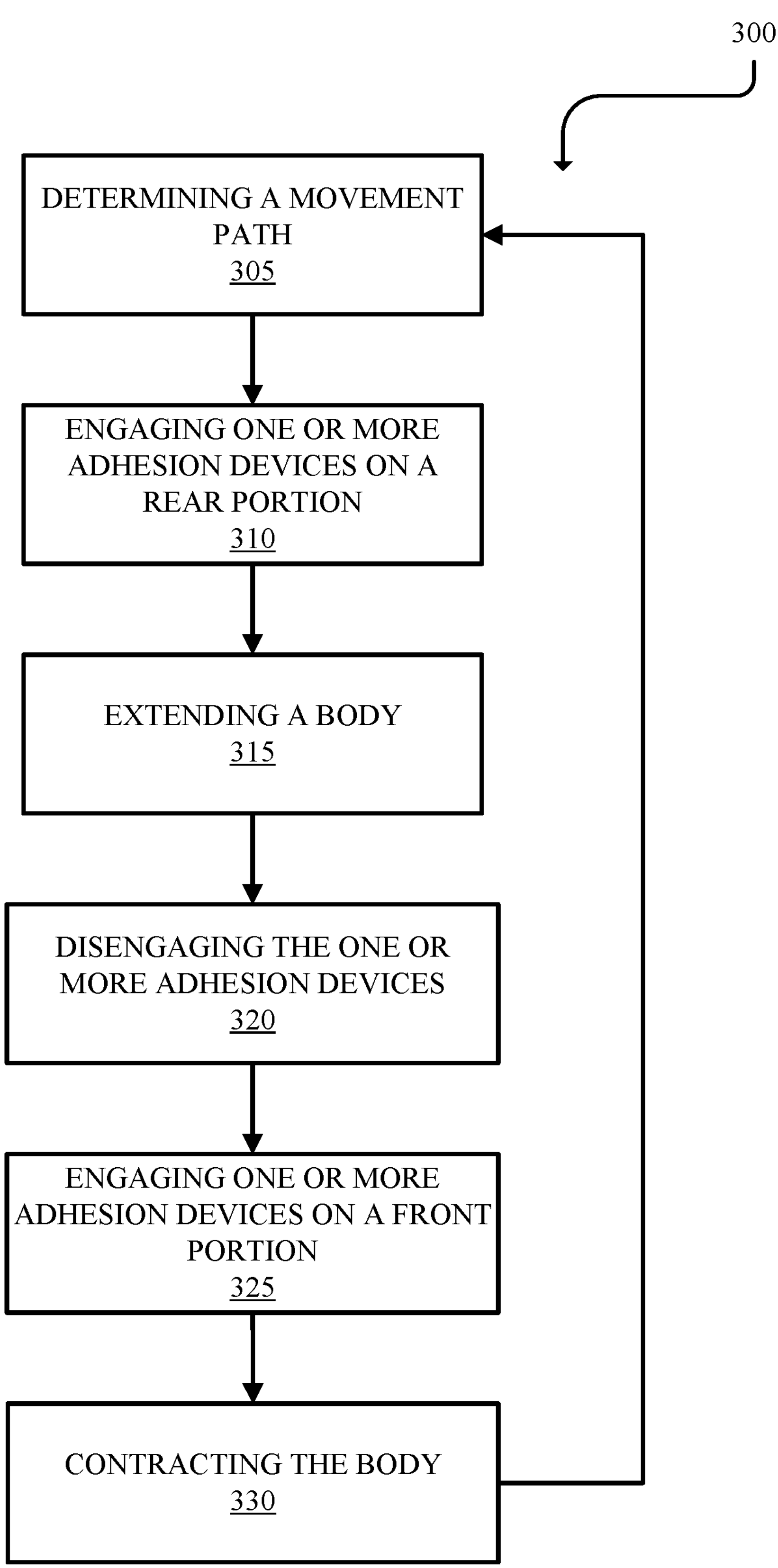
FIG. 3 depicts a method of moving a crevasse 3D printer in a stage of movement according to various embodiments of the present invention.

FIG. 3 shows an example method 300 of moving a crevasse 3D printer through a crevasse. In some embodiments, the crevasse 3D printer may be connected to a computer system to control the crevasse 3D printer.

Method 300 begins with step 305 of determining a movement path for the crevasse 3D printer through a crevasse. In some embodiments, a 3D imaging technique may be used to determine the layout of a crevasse and determine a path for the crevasse 3D printer. For example, the crevasse 3D printer may need to traverse one or more bumps or gaps, and the system may use the 3D imaging determine a placement for one or more adhesion devices of the crevasse 3D printer and how the crevasse 3D printer expands and contracts to traverse the crevasse.

Method 300 continues with step 310 of engaging one or more adhesion devices on a rear portion of the crevasse 3D printer where the crevasse 3D printer is in a contracted state. As discussed above, there may be multiple adhesion devices arrayed around the body of the crevasse 3D printer, and the adhesion devices may be engaged and released to attach parts of the crevasse 3D printer to the walls of a crevasse. The adhesion devices may be a method of attaching the crevasse 3D printer to the sides of the crevasse. For example, the adhesion devices may be vacuum activated suction cups or electromagnets.

Method 300 continues with step 315 of extending a body of a crevasse 3D printer to move a front portion of the crevasse 3D printer forward. With the rear of the crevasse 3D printer attached to the walls of the crevasse with the adhesion devices, extending the body of the crevasse 3D printer moves the front of the crevasse 3D printer forward.

Method 300 continues with step 320 of disengaging the one or more adhesion devices on a rear portion of an extended crevasse 3D printer.

Method 300 continues with step 325 of engaging one or more adhesion devices on a front portion of a contracted crevasse 3D printer. Engaging the front adhesion devices lock the front to the crevasse 3D printer to the walls of the crevasse.

Method 300 continues with step 330 of contracting the body of a crevasse 3D printer to move a rear portion of the crevasse 3D printer forward. With the front of the crevasse 3D printer locked onto the walls of the crevasse, contracting the crevasse 3D printer brings the rear of the crevasse 3D printer forward.

Method 300 may be repeated until the crevasse 3D printer has reached a desired point in the crevasse.

Figure 4:
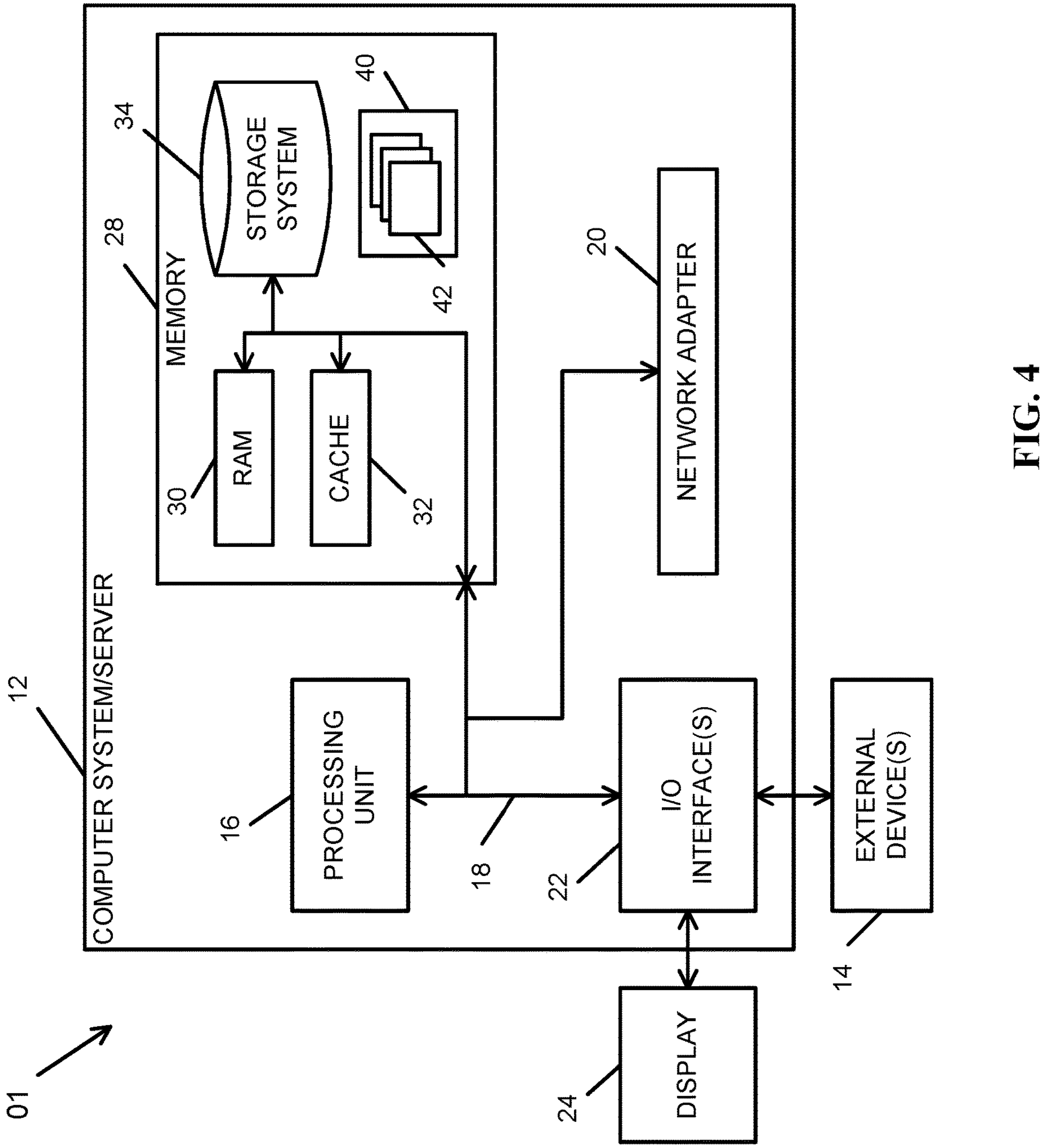
FIG. 4 depicts a computer system according to various embodiments of the present invention.

In an exemplary embodiment, the computer system is a computer system 01 as shown in FIG. 4. Computer system 01 is only one example of a computer system and is not intended to suggest any limitation as to the scope of use or functionality of embodiments of the present invention. Regardless, computer system 01 is capable of being implemented to perform and/or performing any of the functionality/operations of the present invention.

Computer system 01 includes a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 12 may be described in the general context of computer system-executable instructions, such as program modules, being executed by a computer system. Generally, program modules may include routines, programs, objects, components, logic, and/or data structures that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in computer system 01 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As is further depicted and described below, memory 28 may include at least one program product having a set (e.g., at least one) of program modules that are configured to carry out the functions/operations of embodiments of the invention.

Program/utility 40, having a set (at least one) of program modules 42, may be stored in memory 28 by way of example, and not limitation. Exemplary program modules 42 may include an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present invention.

Computer system/server 12 may also communicate with one or more external devices 14 such as a keyboard, a pointing device, a display 24, one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:

engaging one or more rear adhesion devices of a crevasse 3D printer, wherein the crevasse 3D printer has a body comprising a front portion and a rear portion;

extending the body of the crevasse 3D printer to move the front portion of the body forward while the rear portion of the body remains engaged, wherein moving the front portion of body forward increases a length of the body and decreases a width of the body;

disengaging the one or more rear adhesion devices;

engaging one or more front adhesion devices of the crevasse 3D printer;

contracting the body of the crevasse 3D printer to move the rear portion of the body forward while the front portion of the body remains engaged, wherein moving the rear portion of body forward increases the width of the body and decreases the length of the body; and disengaging the one or more front adhesion devices.

2. The method of claim 1, wherein the one or more front adhesion devices and the one or more rear adhesion devices are vacuum adhesion devices.

3. The method of claim 1, wherein the one or more front adhesion devices and the one or more rear adhesion devices are magnetic adhesion devices.

4. The method of claim 1, wherein the body includes a spring to aid in contraction.

5. The method of claim 1, wherein the crevasse 3D printer comprises a material delivery nozzle.

6. A computer program product comprising a computer readable storage medium having program instructions embodied therewith, the program instructions executable by a processor to cause the processor to perform a method, the method comprising:

engaging one or more rear adhesion devices of a crevasse 3D printer, wherein the crevasse 3D printer has a body comprising a front portion and a rear portion;

extending the body of the crevasse 3D printer to move the front portion of the body forward while the rear portion of the body remains engaged, wherein moving the front portion of body forward increases a length of the body and decreases a width of the body;

disengaging the one or more rear adhesion devices;

engaging one or more front adhesion devices of the crevasse 3D printer;

contracting the body of the crevasse 3D printer to move the rear portion of the body forward while the front portion of the body remains engaged, wherein moving the rear portion of body forward increases the width of the body and decreases the length of the body; and disengaging the one or more front adhesion devices.

7. The computer program product of claim 6, wherein the one or more front adhesion devices and the one or more rear adhesion devices are vacuum adhesion devices.

8. The computer program product of claim 6, wherein the one or more front and the one or more rear adhesion devices are magnetic adhesion devices.

9. The computer program product of claim 6, wherein the body includes a spring to aid in contraction.

10. The computer program product of claim 6, wherein the crevasse 3D printer comprises a material delivery nozzle.

* * * * *